RANDOM SIGNAL GENERATOR

Filed Sept. 12, 1951

INVENTOR.
Robert L. Craiglow
BY Marvin Moody
Attorney

Patented May 5, 1953

2,637,845

UNITED STATES PATENT OFFICE 2,637,845

RANDOM SIGNAL GENERATOR

Robert L. Craiglow, Cedar Rapids, Iowa, assignor to Collins Radio Company, Cedar Rapids, Iowa, a corporation of Iowa Application September 12, 1951, Serial No. 246,279

5 Claims. (Cl. 340—345)

This invention relates in general to signalling means and in particular to apparatus for sending random signals over a teletypewriter communication system.

Oftentimes, teletypewriter communication system is used wherein information is coded into marks and spaces before transmission. Each character so transmitted requires that five pulses be transmitted in addition to start and stop pulses which are transmitted before and after each character for synchronizing purposes. In military applications, it is oftentimes desirable to transmit intelligence in a manner such that it can not be decoded by the enemy. For this purpose various codes are used. Codes may be broken if the enemy has time enough to decipher them.

It is an object of this invention to provide a pulse communication system wherein a signal of a random nature will be transmitted at times when there is no intelligence to be sent. The transmission of such a signal which has absolutely no coherence will confuse the enemy and will make it more difficult to break the code. This is so because random noise will be interspersed between messages and if the enemy attempts to analyze a portion of the transmission when it includes random noise, his job will be much more difficult.

A feature of this invention is found in the provision for a random signal generator comprising five balls mounted in two position boxes so that they will always be in one or the other position. A striker periodically strikes the boxes to shake the balls from one side to the other in a random manner. Signal transmitting switches are actuated by the balls if they happen to be on one side of the box.

Further objects, features and advantages of this invention will become apparent from the following description and claims when read in view of the drawings in which:

The apparatus of this invention produces five pulses which determines one of 32 possible characters. The familiar five pulse teletypewriter system utilizes such a procedure and such code is well known to those skilled in the art.

Figure 1:
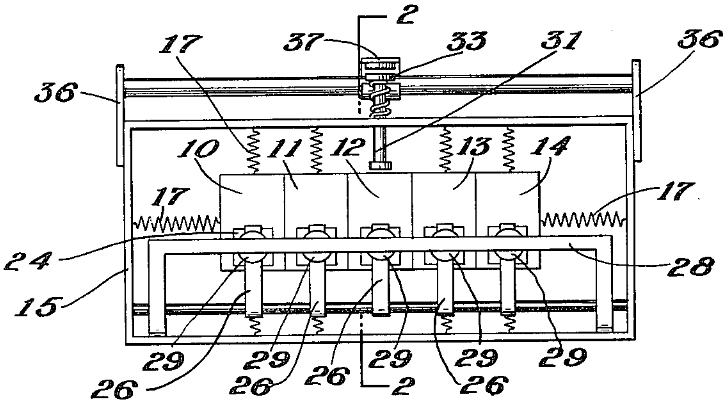
Figure 1 illustrates a top view of the signal generating boxes of this invention.

The random noise generator of this invention comprises, as best shown in Figure 1, five boxes, or cages, 10, 11, 12, 13 and 14, respectively, which are mounted in a holding bracket 15 by springs 17 which extend from the inner edge of the bracket 15 to the boxes. The boxes are connected together by welding or otherwise and thus move as a unit.

Figure 2:
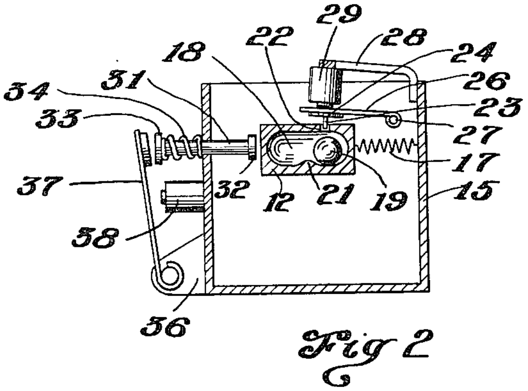
Figure 2 is a sectional view taken on line 2—2 of Figure 1.

As best shown in the sectional view of Figure 2, each of the boxes 10 through 14 is formed with a generally cylindrical opening 18 which holds a ball 19. A partial partition or projection 21 separates the opening 18 into two portions, one of which will always contain the ball 19. An opening 22 is formed through the upper surface of the box 12 at one side of the partition 21 and an actuating pin 23 of a switch 24 is received therethrough.

The switch 24 is mounted on a pivoted lever arm 26 which is pivoted by a pin 27 supported to the frame member 15.

A supporting arm 28 is mounted to the frame member 15 above the lever arm 26 and supports a relay 29 which when energized, lifts the switch 24 so that the pin 23 is clear of the opening 22.

A plunger 31 is slidably supported in the frame member 15 and is formed with a striking portion 32 which is engageable with the box assembly comprising the boxes 10 through 14. A striking plate 33 is mounted to the other end of the plunger 31 and a coil spring 34 is mounted between the striking plate 33 and the frame member 15 to spring bias the plunger away from the boxes. Projections 36 mounted to the frame member 15 pivotally support a second lever arm 37. A second relay 38 is mounted to the frame 15 adjacent the lever arm 37 to cause the lever arm 37 to strike the plunger 31 when it is energized.

It is to be understood that there is a switch 24, a relay 29, and lever arm 26 for each box.

The relays 29 and 38 are energized simultaneously in a manner to be later disclosed and cause the pins 23 to be moved clear of the openings 22 while simultaneously the lever arm 37 strikes the plunger 31 which shakes the boxes 10 through 14. This causes the balls 19 to jostle back and forth over the partition 21 until they come to rest in a new position on one side of the partition. The springs 17 allow the boxes to move relative to the frame and bring them back to the rest position. The position of the balls will be entirely random.

It is to be noted that there is a relay 29 for each box but that only one striking plunger 31 is needed.

Thus, mechanical means are provided for actuating the switches 24. When the ball engages the pin 23 the switch is closed, but when the ball is on the other side of partition 21, the switch stays open.

Figure 3:
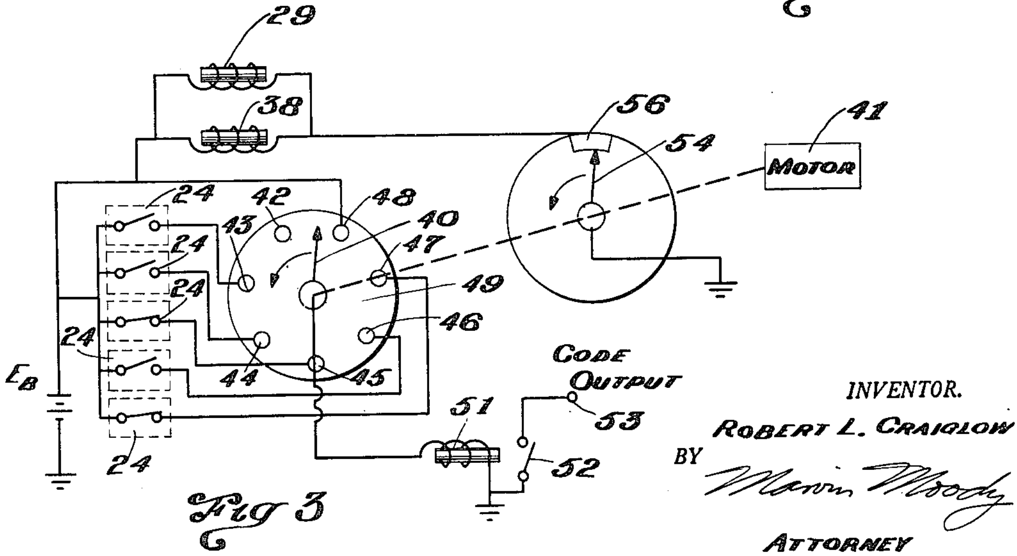
Figure 3 is a wiring diagram illustrating the manner in which signal sending switches are actuated to transmit a random message.

The code output is controlled by the switches 24 with the circuit shown in Figure 3. The switches 24 are shown schematically as two-way switches which may be either opened or closed. The switches have one of their sides connected together and to the positive terminal of a battery $E_b$, which has its opposite side connected to ground. A flying brush 40, similar to conventional teletypewriter brushes, is driven by a motor 41 which rotates at the synchronous speed for transmission as, for example, six revolutions per second if it is desired to transmit 60 words per minute.

The flying brush 40 contacts seven terminals 42, 43, 44, 45, 46, 47, and 48 as it rotates. The contacts 42 through 48 are mounted on a disc 49. The terminals 43 through 47 are each connected to one side of the switches 24. The contact 42 is an open circuit terminal and the terminal 48 is connected to the battery $E_b$. In teletypewriter transmission, it is conventional to transmit a first space called the start interval before sending the five pulse character. A stop pulse comprising a mark is sent after each character.

The flying brush 40 is connected to ground through a relay 51. The relay 51 when energized through the flying brush 40 closes a switch 52 which sends a mark to the terminal 53 which might be connected to the transmitter keying circuits. The flying brush 40 rotates counterclockwise with reference to Figure 3 as indicated by the arrow and engages the start contact 42 to send a space inasmuch as 42 constitutes an open circuit. As the brush sweeps past the contacts 43 through 47, marks and spaces, respectively, will be transmitted depending upon the positions of the switches 24. Since this is determined in a random manner due to the shaking of the boxes by the plunger 31, the five coded pulses will determine some letter or punctuation mark. When the flying brush engages the contact 48, the relay 51 will be energized for the reason that the contact 48 is connected directly to the battery $E_b$ and the stop, or letter end, signal will be transmitted.

A second flying brush 54 is mounted to the motor shaft and rotates with the flying brush 40. It engages a terminal 56 which is located between the contacts 48 and 42. The flying brush 54 is connected to ground. The terminal 56 is connected to one side of the windings of relays 29 and 38 and the opposite sides of the relays are connected to the battery $E_b$. When the brush 54 engages the terminal 56 the relay circuits are closed and the relays are energized. The relays 29 lift the lever arms 26 thus allowing the pins 23 of the switches 24 to clear the openings 22. The relay 38 actuates the lever arm 37 which strikes the plunger 31, thus shaking the boxes 10 through 14 to set up a new random situation. After the brush 54 disengages the terminal 56, the relays 29 and 38 are de-energized and the switches 24 drop so that the pin 23 will be open or closed depending upon whether a ball is directly under it.

The flying brush 40 then engages the contacts 43 through 47 to send a new character.

This procedure is continued until it is desired to send another message at which time the circuit of this invention is disabled in any of a number of well known ways and the message is transmitted. At the end of the transmission of the message, the circuit of this invention is once again energized and transmits a random signal.

Although this invention has been described with respect to particular embodiments thereof, it is not to be so limited as changes and modifications may be made therein which are within the full intended scope of the invention as defined by the appended claims.

I claim:

1. Apparatus for generating a signal of a random nature comprising, a holding bracket, a plurality of boxes formed with generally cylindrical openings flexibly supported by said holding bracket, each of said boxes formed with a partial partition within the cylindrical opening, a ball received in each of said boxes within the cylindrical opening, a plurality of switches pivotally supported by said holding bracket above each of said boxes, an actuating pin extending from each of said switches, an opening formed in each of said boxes with said actuating pins received through said openings when the switches are in their down-positions, first electromagnetic means for striking said boxes to jar the balls in a random manner, and second electromagnetic means controlling the positions of said switches to move them to the up position when the first electromagnetic means jar the boxes.

2. Means for generating a signal in a random manner comprising, a holding bracket, a plurality of boxes flexibly supported by said holding bracket, a plurality of switches pivotally supported by said holding bracket and having actuating pins extending from each switch, each of said boxes formed with a generally cylindrical opening with a partial partition extending therein, a ball received within each of said cylindrical openings, an opening formed in each of said boxes in mating engagement with the pins of said switches, first actuating means controlling the positions of said switches, and second actuating means striking the boxes to displace the balls in a random manner.

3. Means for generating signals in a random nature comprising a holding bracket, a plurality of boxes flexibly supported by said holding bracket, a plurality of switches pivotally supported adjacent said boxes and having actuated pins, each of said boxes formed with a generally cylindrical opening, a partial partition extending within each of said cylindrical openings, a ball received in each of said boxes, second openings formed in each of said boxes in mating engagement with the actuating pins of said switches, first electromagnetic means for controlling the positions of said switches, and second electromagnetic means jarring the boxes to displace the balls in a random manner.

4. Means for generating signals in a random manner comprising a holding bracket, a pair of boxes flexibly supported by said holding bracket, said boxes connected together to make a unitary assembly, a plurality of switches pivotally supported on said holding bracket above said boxes, actuating pins extending from said switches and received in openings formed in said boxes, a generally cylindrical opening formed in each of said boxes, a partial partition within each of said boxes, first electromagnetic means connected to said holding bracket adjacent said switches to move them to an up position when said first electromagnetic means is energized, and second electromagnetic means mounted on the holding bracket to jar the plurality of boxes when the switches are in the up position.

5. Apparatus for generating a random signal comprising, a holding bracket, a plurality of boxes flexibly supported by the holding bracket, a generally cylindrical opening formed in each of said boxes, a partial partition formed in each of said boxes with the generally cylindrical opening, a ball received within each of said boxes, a plurality of switches pivotally supported by said holding bracket, an actuating pin attached to each of said switches, a second opening formed in each of boxes in mating engagement with said actuating pins, first electromagnetic means raising said switches to the up position when energized, and second electromagnetic means jarring the plurality of boxes when the first electromagnetic means is energized.

ROBERT L. CRAIGLOW.

References Cited in the file of this patent

UNITED STATES PATENTS

| Number | Name | Date |
|---|---|---|
| 2,406,031 | Parker | Aug. 20, 1946 |